(12) United States Patent
Masmar et al.

(10) Patent No.: US 6,672,952 B1
(45) Date of Patent: Jan. 6, 2004

(54) TEARABLE ABRASIVE ARTICLE

(75) Inventors: Craig A. Masmar, Lake Elmo, MN (US); Jeffrey S. Peterson, Hudson, WI (US); Michael L. Teetzel, Hugo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/219,711

(22) Filed: Dec. 23, 1998

(51) Int. Cl.[7] .................................................. B24D 3/28
(52) U.S. Cl. ......................... 451/539; 451/536; 51/298
(58) Field of Search ...................... 51/295, 298, 293; 451/526, 527, 530, 532, 533, 536, 539

(56) References Cited

U.S. PATENT DOCUMENTS

| | | |
|---|---|---|
| 3,176,437 A | 4/1965 | Lanyon |
| 3,402,034 A | 9/1968 | Schnabel |
| 3,787,273 A * | 1/1974 | Okrepkie et al. ............. 51/298 |
| 3,853,598 A | 12/1974 | Raguse |
| 3,860,400 A | 1/1975 | Prowse et al. |
| 3,861,892 A | 1/1975 | Wisdom, Jr. et al. |
| 3,906,684 A * | 9/1975 | Marshall et al. ............. 51/298 |
| 3,963,458 A * | 6/1976 | Gladstone et al. ............ 51/295 |
| 4,163,647 A | 8/1979 | Swiatek |
| 4,282,011 A | 8/1981 | Terpay |
| 4,303,724 A * | 12/1981 | Sergeant et al. |
| 4,592,941 A | 6/1986 | Emmons |
| 4,663,223 A * | 5/1987 | Schweyen |
| 4,722,203 A | 2/1988 | Darjee |
| 4,725,487 A * | 2/1988 | Pemrick et al. |
| 4,867,760 A | 9/1989 | Yarbrough |
| 4,908,278 A | 3/1990 | Bland et al. |
| 5,108,815 A | 4/1992 | Adams et al. |
| 5,162,150 A | 11/1992 | Buis et al. |
| 5,304,224 A | 4/1994 | Harmon |
| 5,308,689 A | 5/1994 | Shinkai et al. |
| 5,355,636 A | 10/1994 | Harmon |
| 5,573,619 A | 11/1996 | Benedict et al. |
| 5,573,844 A | 11/1996 | Donovan et al. |
| 5,578,095 A | 11/1996 | Bland et al. |
| 5,578,096 A | 11/1996 | Christianson et al. |
| 5,584,897 A | 12/1996 | Christianson et al. |
| 5,609,706 A | 3/1997 | Benedict et al. |
| 5,624,471 A | 4/1997 | Gaeta et al. |
| 5,679,190 A | 10/1997 | Riedel et al. |
| 5,681,612 A | 10/1997 | Benedict et al. |
| 5,700,302 A | 12/1997 | Stoetzel et al. |
| 5,766,277 A | 6/1998 | DeVoe et al. |
| 5,795,834 A | 8/1998 | Deeb et al. |

FOREIGN PATENT DOCUMENTS

| | | |
|---|---|---|
| EP | 0 301 764 A2 * | 2/1989 |
| GB | 1137556 | 12/1968 |
| WO | WO 86/02306 | 4/1986 |
| WO | WO 97 24222 A * | 7/1997 |

OTHER PUBLICATIONS

Patent Abstracts of Japan, vol. 18, No. 4, & JP 05 247421, Sep. 24, 1993.*

* cited by examiner

Primary Examiner—Robert A. Rose
(74) Attorney, Agent, or Firm—Scott R. Pribnow

(57) ABSTRACT

A tearable abrasive article is provided which includes a backing comprising a polymer film having a scrim partially embedded therein and an abrasive coating comprising a plurality of abrasive articles and a binder bonded to at least one side of the backing.

26 Claims, 2 Drawing Sheets

TEARABLE ABRASIVE ARTICLE

BACKGROUND

Coated abrasive articles generally comprise a backing layer to which a multiplicity of abrasive particles are bonded. In one form, the abrasive particles are bonded to the backing by a first binder, commonly called a make coat. A second binder, commonly called a size coat, is then applied over the make coat and the abrasive particles to reinforce the particles. In a second form, commonly called a slurry coated abrasive coating, the abrasive particles are dispersed throughout a cured binder which bonds the abrasive coating to the backing.

Backings for coated abrasives have been made from a variety of materials, depending upon the product requirements. For example, paper, nonwoven webs, cloth, vulcanized fibers, polymeric film, and combinations thereof have all been used as coated abrasive backings. The choice of a particular backing material for an abrasive article typically involves balancing factors such as cost, strength, tear resistance, adhesion of abrasive coatings, surface finish of the backing, water resistance, and the like in order to select the backing material having the best balance of properties for the desired application.

For example, an advantageous feature in some abrasive articles is easy tearability. Preferred tearable abrasive articles can be torn in straight fashion either in the down-web or cross-web direction thereby allowing the user to tear a sheet of coated abrasive to the desired size without the need for a cutting instrument. Woven cloth backings have typically been used when tearability is desired since the woven nature of the cloth results in a backing which can be torn in straight fashion.

Another advantageous feature in some abrasive articles is a water resistant construction. As used herein "water resistant" means that the performance of the abrasive article is not substantially reduced when the abrasive article is wet or is used to abrade a wet surface. Woven cloth backings typically require expensive treatment coatings in order to produce an abrasive article which is water resistant.

Accordingly, there is a need for a more cost effective water resistant tearable abrasive article.

SUMMARY

The present invention provides an abrasive article comprising a backing and an abrasive coating. The backing comprises a polymer film and a scrim which is partially embedded into the polymer film.

The scrim comprises a plurality of generally parallel warp elements which extend in a first (down-web) direction and a plurality of generally parallel weft elements which extend in a second (cross-web) direction. The second direction is perpendicular from the first direction. As used herein "warp element" refers to an element which extends in the down-web direction in a scrim. As used herein "weft element" refers to an element which extends in the cross-web direction in a scrim. The warp and weft elements may be combined by weaving, stichbonding, or adhesive bonding. The warp and weft elements may be fibers, filaments, threads, yarns or a combination thereof. In a preferred embodiment, the warp and weft elements are yarns which are woven together in a one-over-one weave.

The scrim is partially embedded in the polymer film. As used herein "partially embedded" means that the scrim is embedded in the polymer film but is not completely encased or surrounded by the polymer film. The polymer film is made of a melt processable polymer including thermoplastics, thermoplastic elastomers, elastomers, and blends thereof. Preferably, the polymer is polyethylene since it is inexpensive and is water resistant.

Bonded to at least one side of the backing is an abrasive coating including a binder and a plurality of abrasive particles. The abrasive coating may be a conventional abrasive coating (i.e., having a make coat and a size coat which bond the abrasive particles to the backing) or the abrasive coating may be formed from a slurry. The abrasive coating may be bonded to either the first side or the second side of the backing. In a preferred embodiment, the abrasive coating is bonded to the first side of the backing over the scrim and the polymer film.

The preferred binders are radiation curable because they may be cured on heat sensitive backings (e.g., polyethylene) without damaging the backing and because they may provide an abrasive coating having water resistance. A particularly preferred abrasive coating includes a radiation curable hot melt make coating including an epoxy resin, a polyester component, a polyfunctional acrylate, and a curing agent.

Abrasive articles of the present invention are tearable along a substantially straight line in the first direction and in the second direction. As used herein "tearable" means that the article can be pulled apart or ripped into pieces using hand generated force. The warp and weft elements of the scrim provide directional control to the tear. That is, the abrasive article will typically tear in a direction which is substantially parallel to a warp or weft element.

BRIEF DESCRIPTION OF THE DRAWING

The invention is further illustrated by reference to the accompanying drawings, in which.

DETAILED DESCRIPTION

Figure 1:
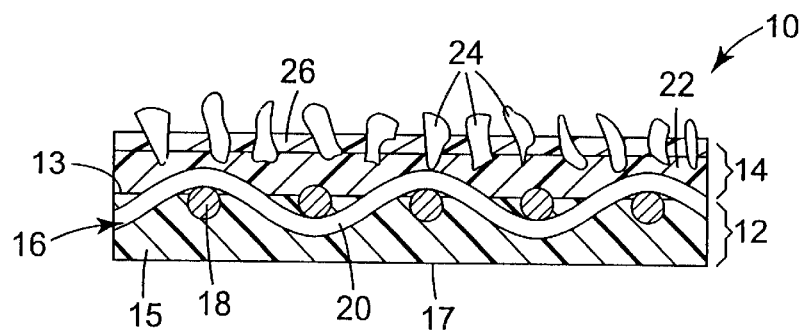
FIG. 1 is an enlarged cross-section of a first embodiment of an abrasive article of the present invention.

Referring to FIG. 1, an enlarged cross-section of a first embodiment of an abrasive article of the present invention is shown. Abrasive article 10 includes backing 12 and abrasive coating 14. Backing 12 comprises polymer sheet 15 which is bonded to scrim 16. Scrim 16 is partially embedded into polymer sheet 15. Scrim 16 comprises a plurality of substantially parallel warp elements 18 and a plurality of substantially parallel weft elements 20 which are woven together in a plain (i.e., one over one) weave. Warp elements 18 are approximately perpendicular to weft elements 20. Backing 12 has first side 13 and second side 17. The first side 13 of backing 12 includes both polymer sheet 15 and the exposed portions of scrim 16.

In the preferred embodiment of FIG. 1, abrasive coating 14 is bonded to first side 13 of backing 12. Abrasive coating 14 comprises make coat 22, abrasive particles 24, and size coat 26. Abrasive particles 24 are embedded in make coat 22, which is applied over the first side 13 of backing 12.

Figure 2:
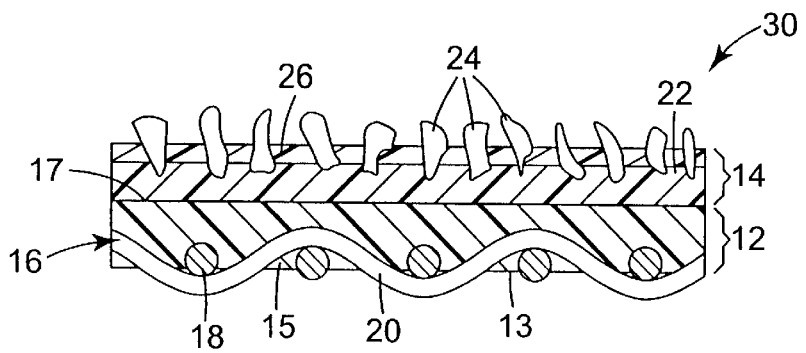
FIG. 2 is an enlarged cross-section of a second embodiment of an abrasive article of the present invention.

Referring now to FIG. 2, a second embodiment of an abrasive article of the present invention is shown which is identified with reference numeral 30. In this embodiment, abrasive coating 14 is bonded to second side 17 of backing 12.

Figure 3:
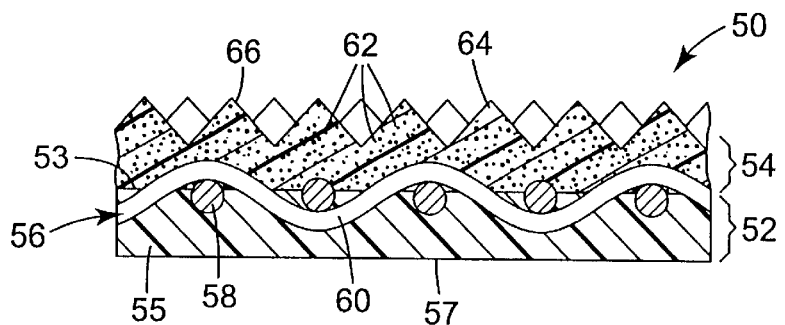
FIG. 3 is an enlarged cross-section of a third embodiment of an abrasive article of the present invention.

Referring now to FIG. 3, an enlarged cross-section of a third embodiment of an abrasive article of the present invention is shown. Abrasive article 50 includes backing 52 and abrasive coating 54. Backing 52 comprises polymer sheet 55 that is bonded to scrim 56. Scrim 56 is partially embedded in polymer sheet 55. Scrim 56 comprises a plurality of substantially parallel warp elements 58 and a plurality of substantially parallel weft elements 60. Warp elements 58 are approximately perpendicular to weft elements 60. Backing 52 has first side 53 and second side 57. The first side 53 of backing 52 includes the exposed surface of polymer sheet 55 and scrim 56.

Abrasive coating 54, which is applied over first side 53 of backing 52, comprises a plurality of abrasive particles 62 dispersed in cured binder 64. Abrasive coating 54 is formed by coating and curing an abrasive slurry, the abrasive slurry including a plurality of abrasive particles dispersed in a binder precursor. Abrasive coating 54 can have any desired surface topography. In FIG. 2, abrasive coating 54 has a structured surface topography comprising a plurality of precisely-shaped pyramidal abrasive composites 66.

Figure 4:
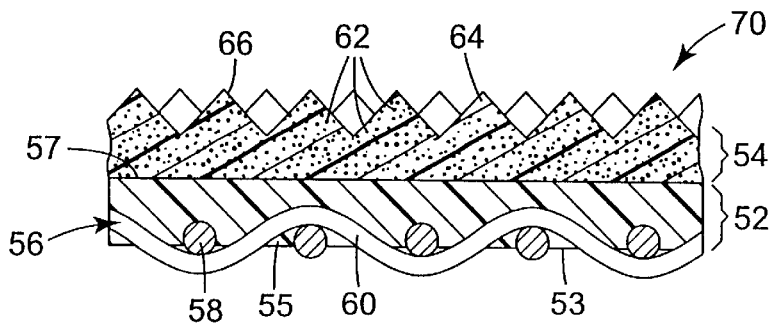
FIG. 4 is an enlarged cross-section of a fourth embodiment of an abrasive article of the present invention.

Referring now to FIG. 4, a fourth embodiment of an abrasive article of the present invention is shown which is identified with reference numeral 70. In this embodiment, abrasive coating 54 is bonded to second side 57 of backing 52. Backing:

Referring to FIG. 1, backing 12 includes scrim 16 and polymer sheet 15 which are bonded to one another. Scrim 16 is embedded in polymer sheet 15 such that the warp elements 18 and weft elements 20 are bonded together at their crossover points by polymer sheet 15. Although scrim 16 is embedded in polymer sheet 15, it is not encased or surrounded by the polymer sheet. Hence, the warp and weft elements of scrim 16 are exposed on the first surface 13 of backing 12. Backing 12 is tearable along the directions of the warp and weft elements. Although not wishing to be bound by any theory, it is believed that backing 12 is tearable because polymer sheet 15 bonds the warp and weft elements together at the points where they overlap one another. Furthermore, it is believed that in the embodiments of an abrasive article of the present invention in which the abrasive coating is bonded to the first side of the backing (see, for example, FIGS. 1 and 3), the tearability of the abrasive article is improved because both the abrasive coating and the polymer sheet function to bond the warp and weft elements together at their crossover points.

Suitable backings may be commercially available as adhesive tape backings, for example, duct tape backings. One suitable backing includes a woven scrim of #30 rayon yarns having 40 yarns/inch (16 yarns/cm) in the down-web direction and 30 yarns/inch (12 yarns/cm) in the cross-web direction. The scrim has a 65 micrometer thick polyethylene coating on one side. Such a backing is commercially available from Shinomura Chemical, Tokyo, Japan. Suitable backings are also reported in U.S. Pat. No. 5,795,834 (Deeb et al.), the disclosure of which is incorporated herein by reference.

The components making up the backing and abrasive coating are described in detail below.

Scrim:

The scrim includes a plurality of warp elements oriented in the machine or down-web direction and a plurality of weft elements oriented in the cross-web direction. As used herein "down-web" refers to the direction that a scrim or web is manufactured, the term being synonymous with "machine direction" or "web direction." As used herein "cross-web" refers to the direction on a scrim or web which is perpendicular to the down-web direction. The warp elements are arranged such that each warp element is substantially parallel to the other warp elements. Similarly, the weft elements are arranged such that each weft element is substantially parallel to the other weft elements. Relative to one another, the warp elements are positioned generally perpendicular to the weft elements. The perpendicular arrangement of the warp and weft elements provides straight lines along which a tear may propagate. It is desirable that the abrasive article of the present invention be easily torn along a straight line since this results in less waste and makes the abrasive article easier to use than one which tears randomly or raggedly.

Figure 5:
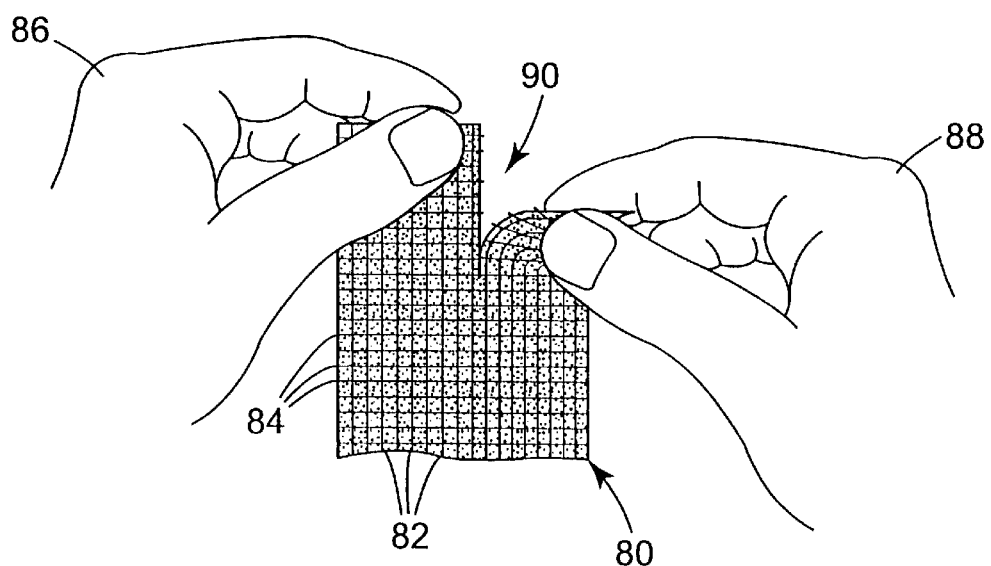
FIG. 5 is a top view of an abrasive article of the present invention being torn.

Referring now to FIG. 5, abrasive article of the present invention 80 is shown. Abrasive article 80 includes warp elements 82 and weft elements 84. Warp elements 82 are perpendicular to weft elements 84. Abrasive article 80 is shown being held between hand 86 and hand 88 which exert a tearing force across the abrasive article. The tearing force results in the formation of tear 90 which propagates across the abrasive article in a substantially straight fashion parallel to warp elements 82. The tearing force causes the weft elements along the tear to be severed. Although abrasive article 80 is shown being torn in a first direction parallel to the warp elements 82, it is understood that abrasive article 80 could also be torn in a second direction parallel to the weft elements 84. In such instance, the warp elements 82 would be severed.

The warp and weft elements may be fibers, filaments, yarns, threads, or a combination thereof. The warp and weft elements may be twisted or textured. Preferably, the warp and weft elements are yarns.

The warp and weft elements are typically combined by a weaving or interlacing process. Alternatively, the scrim can be stitchbonded or a weft insertion scrim. Examples of woven constructions include sateen weaves (i.e., four-over-one weave of the warp yarns over the fill yarns), twill weaves (i.e., three-over-one weave), plain weaves (i.e., one-over-one weave), and drill weaves (i.e., two-over-one weave). In a stitchbonded or weft insertion scrim, the warp and weft yarns are not interwoven, but are oriented in two distinct directions from one another. The warp elements are laid on top of the weft elements and are secured to one another by a stitch yarn or by an adhesive. The preferred scrim is woven with a plain (i.e., one-over-one) weave.

The scrim may be characterized by the scrim density, that is the number of warp and weft elements per unit length. The scrim density in abrasive articles of the present invention may be varied to balance desired properties of the abrasive article. Typically, the scrim density ranges from about 5 warp elements per inch (2 per cm) by 5 weft elements per inch (2 per cm) to about 300 warp elements per inch (118 per cm) by 300 weft elements per inch (118 per cm). Scrims having a looser weave (i.e., less elements per unit length) result in a lower cost backing having a lower tensile strength and greater conformability. Scrims having a tighter weave (i.e., more elements per unit length) result in a higher cost backing having a higher tensile strength and less conformability. Unbalanced weave constructions may be useful when particular performance properties are desired in one direction. One of skill in the art will recognize that it is necessary to assess the desired performance of the resulting abrasive article when selecting the density of the scrim.

The denier of the warp and weft elements is selected to provide an abrasive article which is tearable in the down-web and cross-web directions. If the denier is too large, the abrasive article will not easily tear. If the denier is too small, the warp and weft elements may not effectively provide control of the tear. That is, the warp and weft elements may be too weak to direct the tear in substantially straight fashion. Suitable denier will depend upon the type of element (i.e., fiber, yarn, etc.) and the strength of the material(s) making up the element. Typically, the warp and weft elements have a denier ranging from about 120 to 1500, more preferably ranging from about 135 to 440, and most preferably ranging from about 180 to 355.

The warp and weft element of the scrim may be made of natural materials, synthetic materials, or combinations thereof. Examples of natural materials include cotton, silk, hemp, flax, and combinations thereof. Examples of synthetic materials include rayon, lyocell, polyester, acrylic, acetate, polyolefin (e.g., polyethylene and polypropylene), polybenzimidazole, aramid, poly(vinylacetate), nylon, glass, carbon, spandex, saran, fluorocarbon, and combinations thereof. The preferred material is rayon. Among other considerations, the fiber may be chosen to provide good adhesion between the abrasive coating and the scrim. The choice of fibers may also be dependent upon the cost, tensile strength, tearability, and general performance of the resulting abrasive article.

In an abrasive article of the present invention the scrim may provide several functions. The warp and weft elements, which are partially embedded in the polymer sheet, provide a series of straight lines in the down-web and cross-web directions along which a tear in the abrasive article may propagate. Hence, abrasive articles of the present invention may be hand torn with generally straight tear lines in either the down-web or cross-web direction. In a preferred embodiment of an abrasive article of the present invention where the abrasive coating is bonded to the first surface of the backing (see, FIGS. 1 and 3), the scrim may increase the bond of the abrasive coating to the backing. Specifically, abrasive coating may bond to the exposed portion of the scrim (i.e., that which extends above the polymer sheet). Since the abrasive coating is applied over the exposed scrim, the scrim becomes partially embedded in both the abrasive coating and the polymer sheet. This structure has been has been found to be particularly advantageous for increasing the bond of abrasive coatings to certain difficult to bond to polymer sheets, for example, polyethylene.

Polymer Sheet

The scrim is partially embedded in a polymer sheet. The polymer sheet is heat processable which allows it to be applied to the scrim via methods such as extrusion, lamination, or hot melt coating.

Polymers useful in the present invention are those which are melt processable and include thermoplastics, thermoplastic elastomers, elastomers and blends thereof.

Examples of thermoplastics include polyolefins (e.g., polyethylene and polypropylene) such as "ENGAGE 8200", "ATTANE" and "LINEAR LOW DENSITY POLYETHYLENE 6806" (available from Dow Chemical Co.), and "FLEXOMER 1137 and 1138 (available from Union Carbide); acrylonitrile-butadiene-styrene such as "CYCO-LACT DFA 1000R" (from General Electric, Pittfield Mass.); nylon such as "ZYTEL 159L" (from DuPont); polycarbonate such as "LEXAN 101" (from General Electric Plastics); polyvinyl chloride such as "TEMPRITE 88203" (from B.F. Goodrich); ethylene vinylacetate such as "ELVAX 240" and "ELVAX 40W" (from DuPont) and "ESCORENE LD312.09" (from Exxon); and polyester.

Examples of thermoplastic elastomers include linear, radial, star and tapered styrene-isoprene block copolymers such as "KRAYTON D1107P" (from Shell Chemical Co.) and "EUROPRENE SOL TE 9110" (from EniChem Elastomers Americas, Inc.); linear styrene-(ethylene-butylene) block copolymers such as "KRATON G1657 (available from Shell Chemical Co.); linear styrene-(ethylene-propylene) block copolymers such as "KRATON G1750X" (available from Shell Chemical Co.); linear, radial, and star styrene-butadiene block copolymers such as "KRAYTON D1118X" (from Shell Chemical Co.) and "EUROPRENE SOL TE 6205" (from EniChem Elastomers Americas, Inc.) and polyolefin elastomers based on metallocene catalysis such as "ENGAGE EG8200" (from Dow Chemical Co.).

Examples of elastomers include, but are not limited to natural rubbers; butyl rubbers such as "EXXON BUTYL 268" (from Exxon Chemical Co.); synthetic polyisoprenes such as "CARIFLEX" (from Royal Dutch Shell) and "NAT-SYN 2210" (from Goodyear Tire and Rubber Co.); ethylene-propylenes; polybutadienes; polyisobutylenes such as "VISANEX MML-80" (from Exxon Chemical Co.); and styrene-butadiene random copolymer rubbers such as "AMERIPOL 1011A" (from B.F.Goodrich).

Preferably, the polymer sheet is polyolefin, most preferably polyethylene. Examples of polyethylene include low density, linear low density, high density, and ultra high molecular weight polyethylene. Polyethylene is preferred since it is inexpensive and water resistant.

The thickness of the polymer sheet is dependent upon the desired properties of the abrasive article. For example, a thicker polymer sheet will typically result in an abrasive article which is stiffer (i.e., less conformable) than if a thinner polymer sheet is used. A thicker polymer sheet may also be preferred to improve the tear properties of the backing since the thicker sheet may more readily bond the crossover points of the warp and weft elements of the scrim. It is understood that one of skill in the art must assess the desired properties and cost of the abrasive article to determine the appropriate polymer sheet thickness. Typically, the thickness of the polymer sheet will range from about 12 to 250 micrometers, preferably ranging from about 20 to 200 micrometers. More preferably, the thickness of the polymer sheet will range from about 30 to 100 micrometers, most preferably ranging from about 40 to 70 micrometers.

Fillers, and dyes may optionally be added to the polymer sheet to provide certain desired properties. Fillers may include, for example, colorants (e.g., pigments), plasticizers and antioxidants. Dyes or colorants may be added to give the polyethylene sheet a desired color.

A suitable method of coating the polymer on the scrim is one which sufficiently embeds the polymer into the scrim causing the overlapping warp and weft elements to bond together yet does not cause the polymer to completely penetrate and completely surround the scrim. This results in an abrasive backing which is hand tearable in both the cross-web and down-web directions. Since the polymer does not completely penetrate and completely surround the scrim, the abrasive backing has two distinct sides. One side includes a substantially continuous polymer layer while the second side has exposed scrim. In abrasive articles of the present invention, the abrasive coating is preferably applied to the side of the backing having the exposed scrim. In this way, the abrasive coating bonds to the warp and weft elements of the scrim.

Preferably, the polymer is extruded onto the scrim to form the backing. Other methods, for example, platen pressing and hot laminating may also be suitable, however. As noted, the polymer must be sufficiently embedded into the scrim so as to bond the warp and weft elements together. One of skill in the art recognizes that preferred process conditions will depend upon factors such as, for example, the type of polymer used, the thickness of the polymer, and the type of scrim.

Abrasive Coating

The abrasive coating may be applied to either the first side of the backing (i.e., over the partially embedded scrim, see FIGS. 1 and 3) or the second side of the backing (see, FIGS. 2 and 4). Suitable abrasive coatings include conventional multilayer abrasive coatings and slurry coated abrasive coatings. Conventional multilayer abrasive coatings include a plurality of abrasive particles bonded to the backing by one or more binders (i.e., a make coat, size coat and optional supersize coat). Slurry coated abrasive coatings include a plurality of abrasive particles dispersed throughout a binder. The abrasive coating may be applied to the backing by conventional coating techniques utilized in the manufacture of coated abrasive articles.

Suitable binders for abrasive articles of the present invention are those which can be solidified at conditions that are compatible with the backing and those which provide acceptable adhesion to the backing and abrasive particles. A binder is formed from a liquid or flowable binder precursor which has been solidified. Solidification of the binder precursor can be achieved by curing (i.e., crosslinking or polymerizing) or by drying (e.g., driving off a liquid), by a change in temperature (e.g., hot melt) or a combination thereof. Solidification of the binder precursor is typically the result of exposing the binder precursor to a source of energy such as heat or radiation. As used herein "radiation" includes ultraviolet radiation, gamma radiation, visible radiation, electron beam radiation and combinations thereof. Binder precursors which may be solidified by exposure to radiation energy are referred to as "radiation curable." Binder precursors which may be solidified by exposure to heat are referred to as "thermally curable."

Among other considerations, cost dictates that a particularly desirable backing has a polyethylene polymer sheet. Although backings having polyethylene polymer sheets provide economic advantage, polyethylene may be disfavored as an abrasive backing due to its heat sensitivity and low surface energy. Due to its heat sensitivity, preferred binder precursors for use with polyethylene based backings are those which solidify via processes which transfer minimal heat to the backing. A preferred class of binder precursors which may be cured rapidly with minimal heat transfer to the backing are radiation curable binder precursors. Examples of other binder precursors which may be solidified at low temperatures include, for example, two-part epoxies, urea-formaldehydes, and acrylamides.

Examples of radiation curable binder precursors include, for example, ethylenically unsaturated compounds and vinyl ethers. Ethylenically unsaturated monomers or oligomers may be monofunctional or multifunctional (e.g., difunctional, trifunctional, tetrafunctional, etc.). Functionality refers to the number of polymerizable carbon-carbon double bonds or alpha, beta unsaturated groups per molecule. Ethylenically unsaturated binder precursors include both monomeric and polymeric compounds that contain atoms of carbon, hydrogen and oxygen, and optionally, nitrogen and the halogens. Oxygen and nitrogen atoms, or both, are generally present in ether, ester, urethane, amide, and urea groups. Ethylenically unsaturated compounds typically have a molecular weight of less than about 4,000 grams/mole, and are preferably esters made from the reaction of compounds containing aliphatic monohydroxy groups or aliphatic polyhydroxy groups with unsaturated carboxylic acids, such as acrylic acid, methacrylic acid, itaconic acid, crotonic acid, isocrotonic acid, maleic acid, and the like.

Representative examples of ethylenically unsaturated monomers include methyl acrylate, ethyl acrylate, methyl methacrylate, ethyl methacrylate, styrene, divinylbenzene, hydroxyethyl acrylate, hydroxyethyl methacrylate, hydroxypropyl acrylate, hydroxypropyl methacrylate, hydroxybutyl acrylate, hydroxybutyl methacrylate, vinyl toluene, poly (ethylene glycol)diacrylate, polyethylene glycol diacrylate, ethylene glycol dimethacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetraacrylate and pentaerythritol tetramethacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloxyethyl) isocyanurate, 1,3,5-tri(2-methacryloxyethyl)-s-triazine, acrylamide, methacrylamride, N-methylacrylamide, N,N-dimethylacrylamide, N-vinyl-pyrrolidone, and N-vinyl-piperidone.

A suitable class of acrylated polymers is the acrylated urethanes. Acrylated urethanes are acrylate terminated polyurethane polymers. The polyurethane polymers may be aliphatic or aromatic, polyester or polyether based. Examples of acrylated urethanes include those commercially available under the trade designations "UVITHANE 782" (available from Morton Thiokol Chemical), "CMD 6600", "CMD 8400", and "CMD 8805" (available from UCB Radcure Specialties).

Yet another suitable class of acrylated polymers is the acrylated epoxies. Acrylated epoxies are acrylate esters (typically diacrylate esters) of epoxy resins, such as the diacrylate esters of bisphenol A epoxy resin. Examples of commercially available acrylated epoxies include "CMD 3500", "CMD 3600", and "CMD 3700" (available from UCB Radcure Specialties).

Other suitable acrylated resins include those materials described in U.S. Pat. No. 4,652,274, the disclosure of which is incorporated herein by reference. Briefly, these materials may be described as isocyanurate and isocyanate derivatives having at least one pendant acrylate group. The preferred isocyanurate material is the triacrylate of tris(hydroxyethyl) isocyanurate.

Of the radiation curable materials, the acrylates are particularly preferred for use in slurry coated abrasive coatings. Examples of such materials include mono or multi-functional acrylates (i.e., acrylates and methacrylates), acrylated epoxies, acrylated polyesters, acrylated urethanes, acrylated polyethers, acrylated isocyanurate derivatives and combinations or blends thereof.

In the case of binder precursors containing radiation curable materials, polymerization initiators may be used. Examples of initiators include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Suitable ultraviolet light activated photoinitiators include those sold under the trade designations "IRGACURE 651" and "IRGACURE 184" (commercially available from Ciba Geigy Company, Tarrytown, N.Y.) and "DAROCUR 1173" (commercially available from Merck & Co., Merck Chemicals Division, Rahway, N.Y.). Examples of suitable visible light activated initiators may be found in U.S. Pat. No. 4,735,632 (Larson et al.) and the initiator sold under the trade designation "IRGACURE 369" (available from Ciba Geigy Company).

Typically, an initiator is used in an amount ranging from about 0.1% to 10% by weight, preferably 2% to 4% by weight, based on the weight of the binder precursor. It is preferred to uniformly disperse the initiator in the binder precursor prior to the addition of any particulate material, such as abrasive particles or filler particles.

In the case of light activated polymerizations, the abrasive coating may optionally include a photosensitizer. Examples of photosensitizers include compounds having carbonyl groups or tertiary amino groups and mixtures thereof. Among the preferred compounds having carbonyl groups are benzophenone, acetophenone, benzil, benzaldehyde, o-chlorobenzaldehyde, xanthone, thioxanthone, 9,10-anthraquinone, and other aromatic ketones which can act as photosensitizers. Among the preferred tertiary amines are methyldiethanolamine, ethyldiethanolamine, triethanolamine, phenylmethyl-ethanolamine, and dimethylaminoethylbenzoate. Commercially available photosensitizers include those sold under the trade designations "QUANTICURE ITX", "QUANTICURE QTX", "QUANTICURE PTX", "QUANTICURE EPD" (from Biddle Sawyer Corp., New York, N.Y.). The amount of photosensitizer typically varies from about 0.01% to 10% by weight, more preferably from about 0.25% to 4.0% by weight, based on the weight of the binder precursor.

Structured Abrasive Coatings

A preferred slurry coated abrasive coating may be described as having a structured topography. As used herein "structured" means an abrasive article wherein the abrasive coating comprises a plurality of precisely shaped abrasive composites disposed on a backing in a predetermined array wherein each composite has a predetermined shape and comprises abrasive particles distributed in a binder. The predetermined array of abrasive composites may be either random or non-random. Structured abrasive articles having a non-random array are described in U.S. Pat. No. 5,152,917 (Pieper et al.), the disclosure of which is incorporated herein by reference. Structured abrasive articles having a random array are described in U.S. Pat. No. 5,681,217 (Hoopman et al.), the disclosure of which is incorporated herein by reference.

A preferred method of making an abrasive article having an abrasive coating with a structured topography comprises the steps of:

(1) providing a production tool having a major surface with a plurality of precisely shaped cavities;

(2) filling the precisely shaped cavities with an abrasive slurry including a binder precursor and a plurality of abrasive particles;

(3) laminating the front surface of a backing to the surface of the production tool so that at least a portion of the front surface of the backing is in direct contact with the surface of the production tool; and (4) subjecting the abrasive slurry to conditions sufficient to at least partially cure or solidify the binder precursor.

The production tool has a major surface which contains a plurality of cavities. The cavities define the inverse shape of the abrasive composites and are responsible for generating the shape and placement of the abrasive composites. The cavities may be provided in any geometric shape that is the inverse of a geometric shape which is suitable for an abrasive composite, such as, for example, cubic, cylindrical, prismatic, hemispheric, rectangular, pyramidal, truncated pyramidal, conical, truncated conical, and post-like with a flat top surface. The dimensions of the cavities are selected to achieve the desired areal density of abrasive composites. Preferably, the shape of the cavities is selected such that the surface area of the abrasive composite decreases away from the backing. The cavities can be present in a dot like pattern where adjacent cavities butt up against one another.

The production tool can take the form of a belt, sheet, continuous sheet or web, coating roll such as a rotogravure roll, sleeve mounted on a coating roll, or die. The production tool can be composed of metal, (e.g., nickel), metal alloys, or plastic. The metal production tool can be fabricated by any conventional technique including but not limited to photolithography, knurling, engraving, hobbing, electroforming, and diamond turning. The production tool may optionally contain a release coating to permit easier release of the abrasive article. Examples of such release coatings include silicones and fluorochemicals.

Preferred methods for the production of production tools are disclosed in U.S. Pat. No. 5,435,816 (Spurgeon et al.), U.S. Pat. No. 5,658,184 (Hoopman et al.), and in U.S. Ser. No. 08/923,862 (Hoopman) filed Sep. 3, 1997, the disclosures of which are incorporated herein by reference.

In one aspect of this method, an abrasive slurry is first coated directly onto the front surface of a backing using any conventional coating technique such as, for example, roll coating, transfer coating, spraying, die coating, vacuum die coating, knife coating, curtain coating, or rotogravure coating The production tool is then brought into contact with the abrasive slurry coated backing such that the abrasive slurry flows into the cavities of the production tool. Pressure may be applied by a nip roll or other suitable technique in order to force the abrasive slurry to flow in and fill the cavities of the production tool.

In a preferred aspect of this method, the cavities are filled by coating an abrasive slurry directly onto the production tool. This can be accomplished by any conventional coating method such as, for example, roll coating, transfer coating, spraying, die coating, vacuum die coating, knife coating, curtain coating, or rotogravure coating. A backing is then brought into contact with the outer surface of the production tool such that the abrasive slurry-coated production tool wets the surface of the backing. Pressure may be applied by a nip roll or other suitable technique in order to force the abrasive coating against the backing to improve adhesion between the abrasive slurry and the backing.

Next, the binder precursor is at least partially cured or solidified. This can be accomplished by exposing the abrasive slurry to an energy source. The energy source may be heat, radiation energy (i.e., infrared or visible radiation), or electron beam. Preferably the energy source is radiation energy, most preferably ultraviolet light. If the production tool is made from a material transparent to visible or ultraviolet radiation then visible or ultraviolet light may be transmitted through the production tool to cure or solidify the binder precursor. In this step, the resulting solidified abrasive slurry will have the inverse pattern of the production tool. Following solidification of the binder precursor (i.e., formation of a binder), the abrasive article is separated from the production tool.

Hot Melt Make Coatings

A preferred abrasive coating includes a radiation curable hot-melt make coat. Such an abrasive coating is reported in U.S. Pat. No. 5,766,277 (DeVoe et al.), the disclosure of which is incorporated herein by reference. The make coat includes an epoxy resin, a thermoplastic polyester component, a polyfunctional acrylate component, a curative for the epoxy portion of the make coat formulation, and an optional initiator for the polyfunctional acrylate portion of the formulation that permits the composition to cure upon exposure to energy. Optionally, the hot melt make coat may also include a hydroxyl-containing material to modify the rate of curing and/or stiffness of the make coats, a tackifier, a filler, and the like.

Epoxy resins useful in the make coat are any organic compounds having at least one oxirane ring, i.e.,

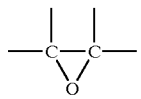

polymerizable by a ring opening reaction. Such materials, broadly called epoxides, include both monomeric and polymeric epoxides and can be aliphatic, cycloaliphatic, or aromatic. These materials generally have, on the average, at least two epoxy groups per molecule (preferably more than two epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy resin may vary from about 74 to about 100,000 or more.

Useful epoxy resins include those which contain cyclohexene oxide groups such as the epoxycyclohexanecarboxylates, typified by 3,4-epoxycyclohexylmethyl-3,4-epoxycyclohexane carboxylate, 3,4-epoxy-2-methylcyclohexylmethyl-3,4-epoxy-2-methycyclohexane carboxylate, and bis(3,4-epoxy-6-methylcyclohexylmethyl) adipate. For a more detailed list of useful epoxides of this nature, reference may be made to U.S. Pat. No. 3,117,099, incorporated herein by reference.

Further epoxy resins which are particularly useful include glycidyl ether monomers of the formula

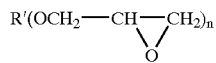

where R' is alkyl or aryl and n is an integer of 1 to 6. Examples are the glycidyl ethers of polyhydric phenols obtained by reacting a polyhydric phenol with an excess of chlorohydrin such as epichlorohydrin, e.g., the diglycidyl ether of 2,2-bis-2,3-epoxypropoxyphenol propane. Further examples of epoxides of this type are described in U.S. Pat. No. 3,018,262, incorporated herein by reference.

Commercially available epoxy resins include octadecylene oxide, epichlorohydrin, styrene oxide, vinyl cyclohexene oxide, glycidol, glycidyl methacrylate, diglycidyl ether of bisphenol A (e.g., those available under the trade designations "EPON 828," "EPON 1004," and "EPON 1001F" from Shell Chemical Co., and "DER-332" and "DER-334," from Dow Chemical Co.), diglycidyl ether of bisphenol F (e.g., "ARALDITE GY281" from Ciba-Geigy), vinylcyclohexene dioxide (e.g., having the trade designation "ERL 4206" from Union Carbide Corp.), 3,4-epoxycyclohexyl-methyl-3,4-epoxycyclohexene carboxylate (e.g., having the trade designation "ERL-4221" from Union Carbide Corp.), 2-(3,4-epoxycyclohexyl-5,5-spiro-3, 4-epoxy)cyclohexanemetadioxane (e.g., having the trade designation "ERL-4234" from Union Carbide Corp.), bis(3, 4-epoxycyclohexyl) adipate (e.g., having the trade designation "ERL-4299" from Union Carbide Corp.), dipentene dioxide (e.g., having the trade designation ERL-4269" from Union Carbide Corp.), epoxidized polybutadiene (e.g., having he trade designation "OXIRON 2001" from FMC Corp.), silicone resin containing poxy functionality, epoxy silanes, e.g., beta-3,4-epoxycyclohexylethyltrimethoxy silane and gamma-glycidoxypropyltrimethoxy silane, commercially available from Union Carbide, flame retardant epoxy resins (e.g., having the trade designation "DER-542," a brominated bisphenol type epoxy resin available from Dow Chemical Co.), 1,4-butanediol diglycidyl ether (e.g., having the trade designation "ARALDITE RD-2" from Ciba-Geigy), hydrogenated bisphenol A-epichlorohydrin based epoxy resins (e.g. having the trade designation "EPONEX 1510" from Shell Chemical Co.), and polyglycidyl ether of phenol-formaldehyde novolak (e.g., having the trade designation "DEN-431" and "DEN-438" from Dow Chemical Co.).

It is also possible to use a compound that has both epoxy and acrylate functionality, for example, as described in U.S. Pat. No. 4,751,138 (Tumey et al.), which is incorporated herein by reference. In this instance, a separate polyfunctional acrylate component is required if the compound having both epoxy and acrylate functionality is monofunctional in acrylate.

Thermoplastic polyesters are preferred as the polyester component of the make coat. Useful polyester components include both hydroxyl and carboxyl terminated materials, which may be amorphous or semicrystalline, of which the hydroxyl terminated materials are more preferred. By "amorphous" is meant a material that displays a glass transition temperature but does not display a measurable crystalline melting point by differential scanning calorimetry (DSC). Preferably the glass transition temperature is less than the decomposition temperature of the initiator (discussed below), but without being more than about 120° C. By "semicrystalline" is meant a polyester component that displays a crystalline melting point by DSC, preferably with a maximum melting point of about 150° C.

The viscosity of the polyester component is important in providing a hot melt make coat (as opposed to a make coat which is a liquid having a measurable viscosity at room temperature). Accordingly, polyester components useful in the make coats preferably have a Brookfield viscosity which exceeds 10,000 milliPascals at 121° C. (measured on a Brookfield Viscometer Model # DV-II employing spindle #27 with a thermocel attachment). Viscosity is related to the molecular weight of the polyester component. Preferred polyester components also have a number average molecular weight of about 7500 to 200,000, more preferably from about 10,000 to 50,000 and most preferably from about 20,000 to 40,000.

Polyester components useful in the make coat comprise the reaction product of dicarboxylic acids (or their diester derivatives) and diols. The diacids (or their diester derivatives) can be saturated aliphatic acids containing from 4 to 12 carbon atoms (including unbranched, branched, or cyclic materials having 5 to 6 atoms in a ring) and/or aromatic acids containing from 8 to 15 carbon atoms.

Examples of suitable aliphatic acids are succinic, glutaric, adipic, pimelic, suberic, azelaic, sebacic, 1,12 dodecanedioic, 1,4-cyclohexanedicarboxylic, 1,3-cyclopentanedicarboxylic, 2-methylsuccinic, 2-methylpentanedioic, 3-methyl-hexanedioic acids and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthio-ether dicarboxylic acid and 4,4'-diphenylamine dicarboxylic acid. Preferably the structure between the two carboxyl groups in these diacids contains only carbon and hydrogen; more preferably it is a phenylene group. Blends of any of the foregoing diacids may be used.

The diols include branched, unbranched, and cyclic aliphatic diols having from 2 to 12 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2'ethanol), cyclohexane-1,4-dimethanol, 1,10-decanediol, 1,12-dodecanediol, and neopentyl glycol. Long chain diols including poly (oxyalkylene) glycols in which the alkylene group contains from 2 to 9 carbon atoms (preferably 2 to 4 carbon atoms) may also be used. Blends of any of the foregoing diols may be used.

Useful, commercially available hydroxyl terminated polyester materials include various saturated, linear, semi-crystalline copolyesters available from Huils America, Inc., under the trade designations including "DYNAPOL S1402," "DYNAPOL S1358," "DYNAPOL S1227," "DYNAPOL S1229" and "DYNAPOL S1401". Useful saturated, linear amorphous copolyesters available from Huls America, Inc. include materials under the trade designations "DYNAPOL S1313" and "DYNAPOL S1430".

A "polyfunctional acrylate" refers to ester compounds which are the reaction product of aliphatic polyhydroxy compounds and (meth)acrylic acids. The aliphatic polyhydroxy compounds include compounds such as (poly) alkylene glycols and (poly)glycerols.

(Meth)acrylic acids are unsaturated carboxylic acids which include, for example, those represented by the following basic formula:

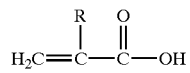

where R is a hydrogen atom or a methyl group.

Polyflinctional acrylates can be a monomer or an oligomer. For purposes of this invention, the term "monomer" means a small (low-molecular-weight) molecule with an inherent capability of forming chemical bonds with the same or other monomers in such manner that long chains (polymeric chains or macromolecules) are formed. For this application, the term "oligomer" means a polymer molecule having 2 to 10 repeating units (e.g., dimer, trimer, tetramer, and so forth) having an inherent capability of forming chemical bonds with the same or other oligomers in such manner that longer polymeric chains can be formed therefrom. Mixtures of monomers and oligomers also could be used as the polyfunctional acrylate component. It is preferred that the polyfunctional acrylate component be monomeric.

Representative polyfunctional acrylate monomers include, by way of example and not limitation: ethylene glycol diacrylate, ethylene glycol dimethacrylate, hexanediol diacrylate, triethylene glycol diacrylate, trimethylolpropane triacrylate, ethoxylated trimethylolpropane triacrylate, glycerol triacrylate, pentaerthyitol triacrylate, pentaerythritol trimethacrylate, pentaerythritol tetraacrylate, pentaerythritol tetramethacrylate, and neopentylglycol diacrylate. Mixtures and combinations of different types of such polyfunctional acrylates also can be used. The term "acrylate", as used herein, encompasses acrylates and methacrylates.

Useful commercially available polyfunctional acrylates include trimethylolpropane triacrylate having the trade designation "SR351," ethoxylated trimethylolpropane triacrylate having the trade designation "SR454," pentaerythritol tetraacrylate having the trade designation "SR295," and neopentylglycol diacrylate having the trade designation "SR247," and all of these being commercially available from Sartomer Co., Exton, Pa.

The polyfunctional acrylate monomers cure quickly into a network due to the multiple functionalities available on each monomer. If there is only one acrylate functionality, a linear, non-networked molecule will result upon cure of the material. Polyfunctional acrylates having a functionality of two or more are preferred to promote the desired polymeric network formation.

Useful polyfunctional acrylate oligomers include commercially available polyether oligomers such as polyethylene glycol 200 diacrylate having the trade designation "SR259" and polyethylene glycol 400 diacrylate having the trade designation "SR344," both being commercially available from Sartomer Co., Exton, Pa.

Other oligomers include acrylated epoxies such as diacrylated esters of epoxy resins, e.g., diacrylated esters of bisphenol A epoxy resin. Examples of commercially available acrylated epoxies include epoxies available under the trade designations "CMD 3500," "CMD 3600," and "CMD 3700," from Radcure Specialties.

A preferred make coat formulation contains, per 100 parts by weight: (a) about 5 to 75 parts by weight of the epoxy resin; (b) about 5 to 94 parts by weight of the polyester component; (c) about 0.1 to 20 parts by weight of the polyfunctional acrylate component; (d) about 0.1 to 4 parts by weight epoxy photocatalyst; (e) about 0 to 4 parts by weight epoxy accelerator; and (f) about 0 to 5 parts by weight free radical photoinitiator. A more preferred make coat formulation includes (a) about 40 to 75 parts by weight of the epoxy resin; (b) about 10 to 55 parts by weight of the polyester component; (c) about 0.1 to 15 parts by weight of the polyfunctional acrylate; (d) about 0.1 to 3 parts by weight epoxy photocatalyst; (e) about 0.1 to 3 parts by weight epoxy accelerator; and (f) about 0.1 to 3 parts by weight free radical photoinitiator.

The make coating may also comprise additives such as a surfactant, a wetting agent, a filler, a plasticizer, a tackifier or mixtures and combinations thereof.

The make coat formulation may be cured by including curatives which promote crosslinking of the make coat precursor. The curatives may be activated by exposure to electromagnetic radiation (e.g., light having a wavelength in the ultraviolet or visible regions of the electromagnetic spectrum), by accelerated particles (e.g., electron beam radiation), or thermally (e.g., heat or infrared radiation). Preferably, the curatives are photoactive; that is, they are photocuratives activated by actinic radiation (radiation having a wavelength in the ultraviolet or visible portion of the electromagnetic spectrum).

An important aspect of the nature of the cure of the make coat formulation resides in that the polyfunctional acrylate component thereof can polymerize via a free radical mechanism while the epoxy portion of the formulation can polymerize via a cationic mechanism. In most instances, when a photocurative is exposed to ultraviolet or visible light, it generates a free radical or a cation, depending on the type of photocurative. Then, the free radical initiates or cation catalyzes the polymerization of the resinous adhesive.

In the case of the free radical curable polyfunctional acrylate component, it is useful to add a free radical initiator to the make coat precursor, although it should be understood that an electron beam source also could be used to initiate and generate free radicals. The free radical initiator preferably is added in an amount of 0.1 to 3.0% by weight, based on the total amount of resinous components. Examples of useful photoinitiators, that generate a free radical source when exposed to ultraviolet light, include, but are not limited to, organic peroxides, azo compounds, quinones, benzophenones, nitroso compounds, acyl halides, hydrazones, mercapto compounds, pyrylium compounds, triacylimidazoles, acylphosphine oxides, bisimidazoles, chloroalkyltriazines, benzoin ethers, benzil ketals, thioxanthones, and acetophenone derivatives, and mixtures thereof. Examples of photoinitiators that generate a source of free radicals when exposed to visible radiation, are described in U.S. Pat. No. 4,735,632, the disclosure of which is incorporated herein by reference. A preferred free radical-generating initiator for use with ultraviolet light is an initiator commercially available from Ciba Geigy Corporation under the trade designation "IRGACURE 651".

A curing agent included in the make coat formulation to promote polymerization of the epoxy resin of the hot melt make coat preferably also is photoactive; that is, the curing agent is preferably a photocatalyst activated by actinic radiation (radiation having a wavelength in the ultraviolet or visible portion of the electromagnetic spectrum). Useful cationic photocatalysts generate an acid to catalyze the polymerization of an epoxy resin. It should be understood that the term "acid" can include either protic or Lewis acids. These cationic photocatalysts can include a metallocene salt having an onium cation and a halogen containing complex anion of a metal or metalloid. Other useful cationic photocatalysts include a metallocene salt having an organometallic complex cation and a halogen containing complex anion of a metal or metalloid which are further described in U.S. Pat. No. 4,751,138 (e.g., column 6, line 65 to column 9, line 45), which is incorporated herein by reference. Another example is an organometallic salt and an onium salt described in U.S. Pat. No. 4,985,340 (col. 4, line 65 to col. 14, line 50); European Patent Applications 306,161; 306, 162, all incorporated herein by reference. Still other cationic photocatalysts include an ionic salt of an organometallic complex in which the metal is selected from the elements of Periodic Group IVB, VB, VIB, VIIB and VIIIB which is described in European Patent Application 109,581, which is also incorporated herein by reference.

The cationic catalyst, as a curing agent for the epoxy resin, preferably is included in an amount ranging from about 0.1 to 3% based on the combined weight of the epoxy resin, polyfunctional acrylate component, and the polyester component, i.e., the resinous components. Increasing amounts of the catalyst results in an accelerated curing rate but requires that the hot melt make coat be applied in a thinner layer so as to avoid curing only at the surface.

Optionally, the hot melt make coats may further comprise a hydroxyl-containing material. The hydroxyl-containing material may be any liquid or solid organic material having hydroxyl functionality of at least 1, preferably at least 2. The hydroxyl-containing organic material should be free of other "active hydrogen" containing groups such as amino and mercapto moieties. The hydroxyl-containing organic material should also preferably be devoid of groups which may be thermally or photochemically unstable so that the material will not decompose or liberate volatile components at temperatures below about 100° C. or when exposed to the energy source during curing. Preferably the organic material contains two or more primary or secondary aliphatic hydroxyl groups (i.e., the hydroxyl group is bonded directly to a non-aromatic carbon atom). The hydroxyl group may be terminally situated, or may be pendant from a polymer or copolymer.

The number average equivalent weight of the hydroxyl-containing material is preferably about 31 to 2250, more preferably about 80 to 1000, and most preferably about 80 to 350. More preferably, polyoxyalkylene glycols and triols are used as the hydroxyl-containing material. Most preferably, cyclohexane dimethanol is used as the hydroxyl-containing material.

The amount of hydroxyl-containing organic material used in the make coat may vary over a broad range, depending on factors such as the compatibility of the hydroxyl-containing material with both the epoxy resin and the polyester component, the equivalent weight and functionality of the hydroxyl-containing material, and the physical properties desired in the final cured make coat.

The optional hydroxyl-containing material is particularly useful in tailoring the glass transition temperature and flexibility of the hot melt make coat.

As the equivalent weight of the hydroxyl-containing material increases, the flexibility of the hot melt make coat correspondingly increases although there may be a consequent loss in cohesive strength. Similarly, decreasing equivalent weight may result in a loss of flexibility with a consequent increase in cohesive strength. Thus, the equivalent weight of the hydroxyl-containing material is selected so as to balance these two properties.

The relative amount of the optional hydroxyl-containing organic material is determined with reference to the ratio of the number of hydroxyl groups to the number of epoxy groups in the hot melt make coat. That ratio may range from 0:1 to 1:1, more preferably from about 0.4:1 to 0.8:1. Larger amounts of the hydroxyl-containing material increase the flexibility of the hot melt make coat but with a consequent loss of cohesive strength. If the hydroxyl containing material is a polyether polyol, increasing amounts will further slow the curing process.

The hot melt make coats may be applied to the backing by extrusion, gravure printing, coating (e.g., by using a coating die, a heatedknife blade coater, a roll coater, a curtain coater, or a reverse roll coater), or as free standing films applied by a lamination process. After coating, the resulting make coat may be exposed to an energy source before the abrasive particles are embedded into the make coat. Alternatively, the abrasive particles may be coated immediately after the make coat precursor is coated. Curing of the hot melt make coat may be initiated upon exposure to an appropriate energy source, for example, radiation having a wavelength in the ultraviolet or visible region of the spectrum, electron beam and/or thermal energy with ultraviolet radiation being preferred.

A size coat may be applied over the abrasive particles and the make coat. The size coat may comprise a glue or a cured resinous adhesive. Examples of suitable resinous adhesives include phenolics, aminoplast resins having pendant alpha, beta-unsaturated groups, urethanes, acrylated urethanes, epoxies, acrylated epoxies, acrylates, isocyanurates, acrylated isocyanurates, urea-formaldehydes, melamine formaldehyde, bis-maleimide and fluorene-modified epoxy resins as well as mixtures thereof. Precursors for the size coat may further include catalysts and/or curing agents to initiate and/or accelerate the curing process.

The size coat may be applied over the abrasive particles and the make coat as a flowable liquid by a variety of techniques known in the art such as roll coating, spray coating, gravure coating, or curtain coating and can be subsequently cured by drying, heating, or with electron beam or ultraviolet light. The particular curing approach may vary depending upon the chemistry of the size coat.

Optional Additives

The abrasive coating may additionally comprise various optional additives such as fillers, grinding aids, fibers, lubricants, wetting agents, surfactants, pigments, antifoaming agents, dyes, coupling agents, plasticizers and suspending agents so long as they do not adversely affect the pressure sensitive adhesive properties of the make coat (before it fully cures) or detrimentally effect the ability of the make or size coats to cure upon exposure to energy. Additionally, the incorporation of these additives, and the amount of these additives should not adversely affect the rheology of the binder precursors. For example, the addition of too much filler can adversely affect processability of the make coat.

Abrasive Particles

The abrasive particles typically have a particle size in a range from about 0.1 to 1500 micrometers, preferably about 0.1 to 400 micrometers. It is preferred that the abrasive particles have a Mohs' hardness of at least about 8, more preferably at least about 9. Examples of such abrasive particles include, for example, fused aluminum oxide (including brown aluminum oxide, heat treated aluminum oxide and white aluminum oxide), green silicon carbide, silicon carbide, chromia, alumina zirconia, diamond, iron oxide, ceria, cubic boron nitride, garnet, sol-gel abrasive particles, and combinations thereof.

The term abrasive particles also encompasses agglomerates wherein single abrasive particles are bonded together. Abrasive agglomerates are further described in U.S. Pat. No. 4,311,489 (Kressner), U.S. Pat. No. 4,625,275 (Bloecher et al.), and U.S. Pat. No. 4,799,939 (Bloecher et al.), the disclosures of which are incorporated herein by reference.

Abrasive particles used in abrasive articles of the present invention can also include a surface coating. Surface coatings are known to improve the adhesion between the abrasive particles and the binder in abrasive articles. They may also improve the abrading properties of the articles. Such surface coatings are described in U.S. Pat. No. 5,011,058 (Wald et al.), U.S. Pat. No. 5,009,675 (Kunz et al.), U.S. Pat. No. 4,997,461. (Markhoff-Matheny et al.), and U.S. Pat. No. 5,042,991 (Kunz et al.), the disclosures of which are incorporated herein by reference.

Water Resistance

A preferred water resistant abrasive article of the present invention may be prepared by appropriate selection of the various components making up the abrasive article and by appropriate orientation of the backing. Suitable polymer sheets for water resistant abrasive articles of the present invention may be made of any polymer which does not swell appreciably when exposed to water. Such polymers include, for example, polyethylene, polypropylene, polyester and like. For water resistance, it may be preferred that the abrasive coating be bonded to the first side of the backing (see, for example, FIGS. 1 and 3). In such abrasive articles, the water resistance of the scrim material is not of primary importance in determining the water resistance of the abrasive article since the scrim is encased between the abrasive coating and the polymer sheet. When the abrasive coating is coated opposite the scrim, a water resistant scrim material may be preferred. Suitable water resistant scrim materials include, for example, polyester or glass. Preferred abrasive coatings for water resistant abrasive articles of the present invention include crosslinked or highly crosslinked binders, for example, 2-part epoxies, radiation curable binders such as acrylates and methacrylates and the hot melt coatings described herein.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Abbreviations used in the examples have the definitions shown in the following schedule.

| | |
|---|---|
| DS1227 | a high molecular weight polyester available under the trade designation "DYNAPOL S1227" commercially available from Huls America, Piscataway, NJ. |
| EP1 | a bisphenol A epoxy resin available under the trade designation "EPON 828" (epoxy equivalent wt. of 185–192 g/eq) commercially available from Shell Chemical, Houston, TX. |
| EP2 | a bisphenol A epoxy resin available under the trade designation "EPON 1001F" (epoxy equivalent wt. of 525–550 g/eq) commercially available from Shell Chemical, Houston, TX. |
| EP3 | a cycloaliphatic epoxy resin available under the trade designation "ERL-4221" commercially available from Union Carbide, Danbury, CT. |
| CHDM | cyclohexanedimethanol available from Eastman Chemical Co., Kingsport, TN. |
| TMPTA | trimethylol propane triacrylate commercially available from Sartomer Co., Exton, PA under the trade designation "SR351". |
| KB1 | 2,2-dimethoxy-1,2-diphenyl-1-ethanone commercially available from Ciba-Geigy under the trade designation "IRGACURE 651" or from Sartomer Co., Exton, PA under the trade designation "KB1". |
| COM | $eta^6$-[xylene (meta xylene or mixed isomers of xylene)]$eta^5$-cyclopentadienyliron(1+) hexafluoroantimonate (1−) (acts as a catalyst). |
| AMOX | di-t-amyloxalate (acts as an accelerator). |
| BAO | brown fused aluminum oxide commercially available from Washington Mills, Niagra Falls, NY under the trade designation "DURALUM". |
| SFAO | semi-friable aluminum oxide commercially available from Treibacher, Austria, under the trade designation "ALODUR FRPL". |
| BK-1 | backing commercially available from Shinomura Chemical, Tokyo, Japan having a woven scrim embedded in a polyethylene film. The woven scrim, having a plain weave, was made up of #30 rayon yarns having 40 warp yarns/inch in the machine direction and 30 weft yarns/inch in the cross-web direction. The scrim was embedded on one side in a 64 micrometer polyethylene film. |

Test Procedure 1 (90° Peel Test)

To measure the adhesion between the backing and the make coat, the abrasive article to be tested was converted into a 8 cm wide by 25 cm long test sample. One-half the length of a wooden board (17.78 cm long by 7.62 wide cm by 0.64 cm thick) was coated with JET-MELT 3779-PG adhesive (commercially available from Minnesota Mining and Manufacturing Company). The same adhesive was also coated over a 15 cm (length) by 8 cm (width) portion the sample on the side of bearing the abrasive particles. The side of the article bearing the abrasive particles and adhesive was attached to the side of the board containing adhesive such that the 10 cm portion of the abrasive article not bearing adhesive overhung the board. Pressure was applied to bond the board and the article. The test set-up was constructed in a manner that ensured that separation during the test would occur between layers of the abrasive article rather than between the abrasive article and the wooden board.

The abrasive article was then scored in a straight line such that its width was reduced to 5.1 cm. The resulting abrasive article/wooden board composite was mounted horizontally in the lower jaw of a tensile testing machine (Sintech, model 6W, available from Sintech, a division of MTS Systems Corp., Research Triangle Park, N.C.) with approximately 1 cm of the overhanging portion of the abrasive article mounted in the upper jaw. The distance between the jaws was initially 12.7 cm. The jaws were then separated at a rate of 0.5 cm/sec with the abrasive article being pulled away from the wooden board at an angle of 90°. The make coat separated from the backing. The separation force was recorded in kilograms per centimeter of article width (kg/cm). Therefore, a larger value indicated better adhesion between the make coat and the backing. Preferably the separation force is at least 1.8 kg/cm, more preferably at least 2 kg/cm. The results are reported below in Table 2.

Test Procedure 2 (Tensile Test)

The backing or abrasive article to be tested was converted into a 2.5 cm by 17.8 cm strip. The strip was installed between the jaws of a tensile testing machine (Sintech, model 6W, available from Sintech, a division of MTS Systems Corp., Research Triangle Park, N.C.) so that the jaws were initially separated by a space of 12.7 cm. The jaws were pulled apart at a rate of 0.5 cm/sec. The machine direction (MD) strips were taken from the machine direction or the warp direction of the abrasive article sample. The cross direction (CD) strips were taken in the cross direction of the backing sample. Additionally, the percent stretch defined as ([final length—initial length]/initial length) of the sample was measured at a 445 N load. The results are reported in Table 2.

Test Procedure 3 (Rocker Drum Test)

A rocker drum test was used to evaluate the ability of an abrasive article to abrade a 0.48 cm square mild steel workpiece. More specifically, the abrasive articles of Examples 1–6 and Comparative Examples A–D were converted into 10.2 cm wide by 15.2 cm long sheets that were mounted to the cylindrical drum of a rocker drum testing machine (machine type) which oscillated (rocked) back and forth at the rate of about 60 strokes per minute (one complete back and forth cycle equals one stroke). During oscillation, the abrasive article was in contact with the mild steel workpiece. The oscillatory motion against a workpiece wore an approximately 0.48 cm wide by 14.0 cm long path on the abrasive article. The force applied to the workpiece was either 26.5 N or 17.6 N (as noted). The weight loss of the workpiece was measured.

General Procedure for Preparing Abrasive Articles

A make coat precursor was prepared from DS1227 (28.0 parts), EP1 (35.5 parts), EP2 (27.0parts), CHDM (2.8 parts), TMPTA (4.5 parts), COM (0.6 part), KB1(1.0 part) and AMOX (0.6 parts). A premix batch was prepared by blending the EP1, CHDM, TMPTA, COM, KB1, and AMOX at 60° C. until the solids were dissolved. Then, the premix, DS1227, and EP2 were blended at approximately 105° C. in a corotating twin-screw extruder. BK-1 backing was corona treated on the scrim side at a level of 1.4 kV, and the make coat precursor (heated to 105° C.) was die-coated onto the backing at the various coating weights reported in Table 1.

The sample was then irradiated with Fusion Systems "V" bulbs, providing approximately 0.25 Joules/cm UV-A radiation. Immediately thereafter, the abrasive particles were electrostatically projected into the make coat precursor at the various coating weights reported in Table 1. The make coat precursor was then thermally cured for 6 seconds at 140° C.

Next, a size coat precursor was roll coated over the abrasive particles and the size coat. The size coat precursor consisted of EP1 (39.4 parts), EP3 (29.5 parts), TMPTA (29.5 parts), KB1 (1.0 part), and COM (0.6 part) and was applied at the various wet coating weights reported in Table 1. The coating was then irradiated with Fusion Systems "D" bulbs, providing approximately 0.5 Joules/cm UV-A radiation. Following this, the sample was thermally cured for 6 seconds at 140° C. Performance was determined by Test Procedure 3 for each example. This data is reported in Tables 3–5.

Examples 1–7

Examples 1–7 were prepared by the General Procedure For Preparing Abrasive Articles with the abrasive particle type, abrasive particle grade, make coat weight, abrasive particle coating weight, and size coat weight as reported in Table 1. The make coat precursor in Examples 5–6 was thermally cured for 6 seconds at 120° C.

TABLE 1

| SAMPLE | Abrasive Particle Type (grade) | Make Coat Weight (Wet) (g/m$^2$) | Abrasive Particle Weight (Wet) (g/m$^2$) | Size Coat Weight (Wet) (g/m$^2$) |
|---|---|---|---|---|
| Example 1 | BAO (P180) | 23 | 133 | 68 |
| Example 2 | BAO (P180) | 23 | 133 | 68 |
| Example 3 | BAO (P180) | 32 | 138 | 64 |
| Example 4 | BAO (P80) | 34 | 140 | 103 |
| Example 5 | SFAO (P80) | 45 | 214 | 116 |
| Example 6 | SFAO (P240) | 35 | 100 | 60 |
| Example 7 | SFAO (P400) | 32 | 77 | 26 |

90° Peel and Tensile Data For Comp. Ex. A and Examples 1–4

The 90° peel of Comparative Example A and Examples 1 and 2 were determined by Test Procedure 1 and are reported in Table 2. The machine and cross direction tensile of Comparative Example A and Examples 1 and 3–4 were measured using Test Procedure 2 and are reported in Table 2.

TABLE 2

| Sample | 90° Peel (Kg/cm) | Tensile Strength MD (Kg/cm) | CD (Kg/cm) |
|---|---|---|---|
| Comp. Ex. A | 2.2 | 23.1 | 7.3 |
| Example 1 (abrasive coating on 1st side of backing) | 2.1 | 7.3 | 4.3 |
| Example 2 (abrasive coating on 2nd side of backing) | 0.6 | — | — |
| Example 3 | — | 7.5 | 4.5 |
| Example 4 | — | 7.5 | 4.3 |

Comp. Ex. A is 311T Blue Grit™ Utility Cloth, grade 180 (available from Minnesota Mining and Manufacturing Company, St. Paul, Minn.).

From the above 90° peel data in Table 2, it can be seen that the adhesion between the make coat and the backings of Comparative A and Example 1 (abrasive coating on first side of backing) are essentially identical. However, Example 2 (abrasive coating on second side of backing) has substantially lower adhesion between the backing and the make coat.

Rocker Drum Performance of Comparative A and Examples 1, 3, and 4

Test procedure 3 was utilized to compare the abrasive performance of Comparative A and Examples 1, 3 and 4. The results are reported in Table 3.

TABLE 3

| | Rocker Drum Testing | | | | | |
|---|---|---|---|---|---|---|
| | Cut¹ (g) | Particle¹ Loss (g) | Cut² (g) | Particle² Loss (g) | Cut³ (g) | Particle³ Loss (g) |
| Comp.Ex. A | 0.25 | 0.05 | 0.21 | 0.04 | 0.14 | 0.02 |
| Ex. 1 | 0.18 | 0.01 | 0.14 | 0.03 | 0.10 | 0.03 |
| Ex. 3 | 0.20 | 0.02 | 0.15 | 0.03 | 0.11 | 0.01 |
| Ex. 4 | 0.5 | 0.01 | 0.11 | 0.01 | 0.09 | 0.00 |

¹Force: 26.5 N, 400 strokes.
²Force: 26.5 N, 300 strokes.
³Force: 17.6 N, 300 strokes.

The data in Table 3 indicates that Comparative Example A provides higher cut but that Examples 1, 3, and 4 lose less abrasive mineral particles during this test than Comparative Example A.

Effect of Water Soak on Abrasive Articles of Example 4

10.2 cm by 15.2 cm samples of Example 4 were cut from the center of the web and were double flexed. One sample was soaked in 22° C. water for 24 hours. After soaking for 24 hours, the sample was removed from the water and excess surface water was dried from the sample using a paper towel. The samples were then testing in accordance with Test Procedure 3. The results are reported in Table 4.

TABLE 4

| | Rocker Drum Testing Force = 17.6 N, 300 cycles | |
|---|---|---|
| | Cut (g) | Particle Loss (g) |
| Example 4 | 0.09 | 0.01 |
| Example 4 (24 hour water soak) | 0.09 | 0.01 |

The data in Table 4 demonstrates that the abrasive of Example 4 is unreduced in cut after being soaked for 24 hours in water.

Rocker Drum Performance of Comparative Examples B–D and Examples 5–7

Comparative Examples B–D and Examples 5–7 were tested in accordance with Test Procedure 3. The workpiece abraded was a 1.27 cm square piece of aluminum. The results are reported in Table 5.

TABLE 5

| | Rocker Drum Testing Force = 26.5 N | | | |
|---|---|---|---|---|
| | Strokes | Abrasive Particle Grade | Cut (g) | Particle Loss (g) |
| Comp. Ex. B | 500 | 80 | 0.40 | 0.06 |
| Example 5 | 500 | P80 | 0.47 | 0.13 |
| Comp. Ex. C | 250 | 240 | 0.175 | 0.03 |
| Example 6 | 250 | P240 | 0.180 | 0.025 |
| Comp. Ex. D | 100 | 400 | 0.02 | 0.035 |
| Example 7 | 100 | P400 | 0.03 | 0.01 |

Comp. Example B is 311T Blue Grit™ Utility Cloth¹, grade 80 (available from Minnesota Mining and Manufacturing Company, St. Paul, Minn.).

Comp. Example C is 311T Blue Grit™ Utility Cloth¹, grade 240 (available from Minnesota Mining and Manufacturing Company, St. Paul, Minn.).

Comp. Example D is 211K Elektrocut™ Cloth, grade 400 (available from Minnesota Mining and Manufacturing Company, St. Paul, Minn.).

¹3M Blue Grit™ Utility Cloth includes a cotton cloth backing having a glue make coat, urea formaldehyde size coat, and brown aluminum oxide abrasive particles.

The data in Table 5 demonstrates that the abrasives of Examples 5–7 perform favorably to the abrasives of Comparative Examples B–D, respectively. This data also shows that abrasive constructions of the present invention perform acceptably throughout a broad range of abrasive mineral particle sizes.

What is claimed is:
1. An abrasive article comprising:
   a backing having a first side and a second side, the backing comprising:
   a polymer film having a first side and a second side; and
   a scrim partially embedded into the first side of the polymer film thereby defining the first side of the backing, the scrim comprising a plurality of generally parallel warp elements extending in a first direction and a plurality of generally parallel weft elements extending in a second direction wherein the first direction and the second direction are perpendicular to one another;

an abrasive coating comprising a plurality of abrasive particles and a binder bonded to at least one side of the backing;

wherein the abrasive article is tearable along a substantially straight line in the first direction and in the second direction.

2. The abrasive article of claim 1 wherein the abrasive particles are selected from the group consisting of fused aluminum oxide, heat treated aluminum oxide, white aluminum oxide, green silicon carbide, silicon carbide, chromia, alumina zirconia, diamond, iron oxide, ceria, cubic boron nitride, garnet, sol-gel abrasive particles, and combinations thereof.

3. The abrasive article of claim 1 wherein the abrasive article is water resistant.

4. The abrasive article of claim 1 wherein the polymer film has a thickness ranging from about 12 to about 250 micrometers.

5. The abrasive article of claim 1 wherein the polymer film has a thickness ranging from about 30 to about 100 micrometers.

6. The abrasive article of claim 1 wherein the polymer film has a thickness ranging from about 40 to about 70 micrometers.

7. The abrasive article of claim 1 wherein the polymer film comprises a thermoplastic selected from the group consisting of polyethylene, polypropylene, acrylonitrile-butadiene-styrene, nylon, polycarbonate, polyvinyl chloride, and ethylene vinylacetate.

8. The abrasive article of claim 1 wherein the polymer film comprises a thermoplastic elastomer selected from the group consisting of styrene-isoprene block copolymers, linear styrene-(ethylene-butylene) block copolymers, linear styrene-(ethylene-propylene) block copolymers, styrene-butadiene block copolymers and polyolefin elastomers.

9. The abrasive article of claim 1 wherein the polymer film comprises an elastomer selected from the group consisting of natural rubbers, butyl rubbers, synthetic polyisoprenes, ethylene-propylenes, polybutadienes, polyisobutylenes and styrene-butadiene random copolymer rubbers.

10. The abrasive article of claim 1 wherein the warp elements and the weft elements are fibers, filaments, threads, yarns, or a combination thereof.

11. The abrasive article of claim 1 wherein the scrim has a density ranging from about 2 warp by 2 weft elements per centimeter to about 118 warp by 118 weft elements per centimeter.

12. The abrasive article of claim 1 wherein the scrim has a density ranging from about 10 warp by 10 weft elements per centimeter to about 30 warp by 30 weft elements per centimeter.

13. The abrasive article of claim 1 wherein the warp elements and the weft elements have a denier ranging from about 120 to 1500.

14. The abrasive article of claim 1 wherein the warp elements and the weft elements have a denier ranging from about 135 to 440.

15. The abrasive article of claim 1 wherein the warp elements and the weft elements have a denier ranging from about 180 to 355.

16. The abrasive article of claim 1 wherein the warp and weft elements are made of rayon, lyocell, cotton, polyester, acetate, acrylic, polyethylene, polypropylene, polybenzimidazole, nylon, glass, aramid, poly(vinylacetate), carbon, spandex, saran, fluorocarbon and combinations thereof.

17. The abrasive article of claim 1 wherein the scrim is woven.

18. The abrasive article of claim 1 wherein the scrim is woven in a one-over-one weave.

19. The abrasive article of claim 1 wherein the warp elements and the weft elements are stitchbonded to one another.

20. The abrasive article of claim 1 wherein the warp elements and the weft elements are adhesively bonded to one another.

21. The abrasive article of claim 1 wherein the abrasive coating has a structured topography comprising a plurality of precisely-shaped abrasive composites each of the composites comprising a plurality of abrasive particles dispersed in a binder.

22. The abrasive article of claim 1 wherein the binder is radiation curable.

23. The abrasive article of claim 22 wherein the radiation curable binder is selected from the group consisting of acrylate monomers, acrylated urethanes, acrylated epoxies, acrylated polyesters, acrylated polyethers and combinations thereof.

24. The abrasive article of claim 1 wherein the abrasive coating comprises a make coat, a plurality of abrasive particles and a size coat.

25. The abrasive article of claim 24 wherein the make coat comprises an epoxy resin, a polyester component, a polyfunctional acrylate and a curing agent for crosslinking the epoxy resin.

26. An abrasive article comprising:
  a backing.having a first side and a second side, the backing comprising:
    a polyethylene film having a first side and a second side; and
    a woven raypn scrim partially embedded into the first side of the polymer film thereby defining the first side of the backing, the scrim comprising a plurality of generally parallel warp yarns extending in a first direction and a plurality of generally parallel weft yarns extending in a second direction wherein the first direction and the second direction are perpendicular to one another;
  an abrasive coating bonded to the first side of the backing, the abrasive coating comprising a make coat, a plurality of abrasive particles and a size coat wherein the make coat comprises a comprises an epoxy resin; a polyester component; a polyfunctional acrylate; and a curing agent for crosslinking the epoxy resin;
  wherein the abrasive article is tearable along a substantially straight line in the first direction and in the second direction.

* * * * *

UNITED STATES PATENT AND TRADEMARK OFFICE
CERTIFICATE OF CORRECTION

PATENT NO. : 6,672,952 B1
DATED : January 6, 2004
INVENTOR(S) : Masmar, Craig A.

It is certified that error appears in the above-identified patent and that said Letters Patent is hereby corrected as shown below:

Column 5,
Line 44, delete second "has been";

Column 10,
Line 36, insert -- . -- following "coating";

Colunn 12,
Line 11, delete "he", insert in place thereof -- the --;

Column 13,
Line 29, delete "Huils", insert in place thereof -- Hüls --;

Column 16,
Lines 13-14, the sentence beginning with "The number…' is part of the previous paragraph;
Lines 31-32, the sentence beginning with "As the…' is part of the previous paragraph;

Column 24,
Line 39, delete "." betweeen "backing" and "having";
Line 54, delete "a compromises" following "compromises".

Signed and Sealed this

Sixth Day of July, 2004

JON W. DUDAS
*Acting Director of the United States Patent and Trademark Office*